(12) United States Patent
Trujillo et al.

(10) Patent No.: US 10,265,849 B2
(45) Date of Patent: Apr. 23, 2019

(54) ELECTRIC MOTOR BASED HOLDING CONTROL SYSTEMS AND METHODS

(71) Applicant: Delaware Capital Formation, Inc., Wilmington, DE (US)

(72) Inventors: Orlando Trujillo, Westland, MI (US); James W. Geary, Pawcatuck, CT (US)

(73) Assignee: Delaware Capital Formation, Inc., Wilmington, DE (US)

( * ) Notice: Subject to any disclaimer, the term of this patent is extended or adjusted under 35 U.S.C. 154(b) by 0 days.

(21) Appl. No.: 15/808,933

(22) Filed: Nov. 10, 2017

(65) Prior Publication Data

US 2018/0085918 A1 Mar. 29, 2018

Related U.S. Application Data

(62) Division of application No. 13/525,436, filed on Jun. 18, 2012, now Pat. No. 9,815,193.

(60) Provisional application No. 61/501,418, filed on Jun. 27, 2011.

(51) Int. Cl.
G05B 19/04 (2006.01)
B25J 9/16 (2006.01)

(52) U.S. Cl.
CPC .................... B25J 9/1612 (2013.01)

(58) Field of Classification Search
CPC ...................................... B25J 9/1612
USPC ......................................... 318/159
See application file for complete search history.

(56) References Cited

U.S. PATENT DOCUMENTS

| | | | |
|---|---|---|---|
| 2,135,861 A | 11/1938 | Thompson | |
| 3,668,910 A | 6/1972 | Gentry et al. | |
| 4,598,942 A | 7/1986 | Shum et al. | |
| 4,600,357 A | 7/1986 | Coules | |
| 4,653,159 A * | 3/1987 | Henderson | H01B 13/01245 140/93 R |
| 4,672,281 A | 6/1987 | Yagusic et al. | |
| 4,680,523 A | 7/1987 | Goumas et al. | |
| 4,682,089 A | 7/1987 | Tamari | |
| 4,693,505 A | 9/1987 | DiMeo | |
| 4,696,501 A | 9/1987 | Webb | |

(Continued)

FOREIGN PATENT DOCUMENTS

| | | |
|---|---|---|
| EP | 402229 A1 | 12/1990 |
| JP | 2000308395 A | 11/2000 |

(Continued)

*Primary Examiner* — Eduardo Colon Santana
*Assistant Examiner* — Devon Joseph
(74) *Attorney, Agent, or Firm* — Harness, Dickey & Pierce, P.L.C.

(57) ABSTRACT

A holding system includes a force control module configured to generate a force signal to cause a holding device to perform at least one of a hold stroke and a release stroke. The hold stroke includes transitioning a gripping element of the holding device to a first position to grip an object. The release stroke includes transitioning the gripping element to a second position to release the object. The holding device is non-backdrivable. A stall detection module is configured to (i) monitor a sensor signal received from a sensor of an electric motor assembly of the holding device and (ii) detect a first stall condition of an electric motor based on the sensor signal. A shut off module is configured to shut off current to the electric motor based on the detection of the first stall condition during or at an end of the release stroke.

10 Claims, 17 Drawing Sheets

(56) References Cited

U.S. PATENT DOCUMENTS

| | | | |
|---|---|---|---|
| 4,699,414 A | 10/1987 | Jones | |
| 4,707,013 A | 11/1987 | Vranish et al. | |
| 4,786,847 A | 11/1988 | Daggett et al. | |
| 4,791,588 A | 12/1988 | Onda et al. | |
| 4,792,715 A | 12/1988 | Barsky et al. | |
| 4,808,018 A | 2/1989 | Robertson et al. | |
| 4,812,731 A * | 3/1989 | Lovrenich | B25B 1/18 318/592 |
| 4,816,730 A | 3/1989 | Wilhelm, Jr. et al. | |
| 4,872,803 A | 10/1989 | Asakawa | |
| 4,908,556 A | 3/1990 | Daggett et al. | |
| 5,161,846 A | 11/1992 | Yakou | |
| 5,204,598 A | 4/1993 | Torii et al. | |
| 5,242,259 A | 9/1993 | Yeakley | |
| 5,253,912 A | 10/1993 | Andorlini et al. | |
| 5,367,236 A | 11/1994 | Salazar | |
| 5,413,611 A | 5/1995 | Haslam, II et al. | |
| 5,501,498 A | 3/1996 | Ulrich | |
| 5,838,124 A * | 11/1998 | Hill | H02P 6/00 318/269 |
| 5,847,530 A * | 12/1998 | Hill | H02P 6/08 318/599 |
| 5,945,798 A | 8/1999 | Stagnitto et al. | |
| 6,242,879 B1 | 6/2001 | Sagues et al. | |
| 6,317,653 B1 | 11/2001 | Kamiya | |
| 6,580,252 B1 | 6/2003 | Yu | |
| 6,641,189 B2 | 11/2003 | Moilanen et al. | |
| 6,813,983 B2 * | 11/2004 | Gass | B23D 45/06 192/138 |
| 6,880,440 B2 * | 4/2005 | Gass | B23D 45/06 192/129 R |
| 6,948,708 B2 | 9/2005 | Moilanen et al. | |
| 7,295,893 B2 | 11/2007 | Sunaoshi | |
| 7,321,808 B2 | 1/2008 | Nagamatsu | |
| 7,443,115 B2 | 10/2008 | Okamoto et al. | |
| 7,602,306 B2 | 10/2009 | Kashio et al. | |
| 7,761,184 B2 | 7/2010 | Moridaira et al. | |
| 7,888,900 B2 | 2/2011 | Okamoto et al. | |
| 7,895,927 B2 * | 3/2011 | Gass | B23D 47/08 83/62.1 |
| 7,950,710 B2 | 5/2011 | Matsukuma et al. | |
| 8,104,810 B2 | 1/2012 | Holcomb et al. | |
| 8,157,305 B2 | 4/2012 | Okazaki et al. | |
| 8,396,594 B2 | 3/2013 | Okazaki | |
| 8,405,340 B2 | 3/2013 | Moon et al. | |
| 8,442,678 B2 | 5/2013 | Ichikawa et al. | |
| 8,618,762 B2 | 12/2013 | Reiland et al. | |
| 9,623,498 B2 * | 4/2017 | Gass | B23D 45/067 |
| 9,815,193 B2 | 11/2017 | Trujillo et al. | |
| 2002/0088681 A1 * | 7/2002 | Berger | F16D 48/066 192/3.63 |
| 2003/0015982 A1 | 1/2003 | Cox-Smith et al. | |
| 2004/0140787 A1 | 7/2004 | Okamoto et al. | |
| 2006/0095143 A1 | 5/2006 | Sunaoshi | |
| 2007/0001993 A1 | 1/2007 | Koizumi et al. | |
| 2007/0295563 A1 | 12/2007 | Iwata et al. | |
| 2008/0046122 A1 | 2/2008 | Manzo et al. | |
| 2008/0048514 A1 | 2/2008 | Hoffmann et al. | |
| 2008/0062604 A1 | 3/2008 | Brombach et al. | |
| 2008/0074197 A1 | 3/2008 | Miao et al. | |
| 2008/0251589 A1 | 10/2008 | Grbovic | |
| 2008/0297092 A1 | 12/2008 | Nihei et al. | |
| 2009/0018700 A1 | 1/2009 | Okamoto et al. | |
| 2009/0051307 A1 | 2/2009 | Katsuyama et al. | |
| 2009/0076657 A1 | 3/2009 | Tsuboi et al. | |
| 2009/0173560 A1 | 7/2009 | Nakamoto et al. | |
| 2009/0179445 A1 | 7/2009 | Coville | |
| 2009/0289591 A1 | 11/2009 | Kassow et al. | |
| 2009/0302626 A1 | 12/2009 | Dollar et al. | |
| 2009/0326365 A1 | 12/2009 | Goldenberg et al. | |
| 2010/0010670 A1 | 1/2010 | Matsukuma et al. | |
| 2010/0139437 A1 * | 6/2010 | Ichikawa | B25J 9/1612 74/490.05 |
| 2010/0193267 A1 | 8/2010 | Nozawa | |
| 2011/0056005 A1 * | 3/2011 | Baumoel | A47K 13/10 4/246.1 |
| 2011/0119819 A1 | 5/2011 | Baumoel | |
| 2011/0148132 A1 * | 6/2011 | Park | B25J 15/0266 294/106 |
| 2011/0221521 A1 | 9/2011 | Razzell et al. | |
| 2012/0010747 A1 * | 1/2012 | Okazaki | G05B 19/423 700/253 |
| 2012/0072023 A1 | 3/2012 | Ota | |
| 2012/0217795 A1 | 8/2012 | Hasegawa et al. | |
| 2012/0217908 A1 * | 8/2012 | Wu | H02P 21/04 318/400.02 |
| 2012/0239197 A1 * | 9/2012 | Ganz | B25J 15/026 700/260 |
| 2013/0119912 A1 | 5/2013 | Ayano et al. | |
| 2013/0328596 A1 | 12/2013 | Zoels et al. | |
| 2014/0269831 A1 | 9/2014 | Tang | |
| 2015/0328771 A1 * | 11/2015 | Yuelai | B25J 9/1612 414/730 |
| 2015/0377717 A1 | 12/2015 | Rollin et al. | |
| 2015/0381101 A1 | 12/2015 | Odaka et al. | |
| 2016/0226431 A1 | 8/2016 | Enoki | |

FOREIGN PATENT DOCUMENTS

| | | |
|---|---|---|
| JP | 2006043303 A | 2/2006 |
| JP | 2009125851 A | 6/2009 |

* cited by examiner

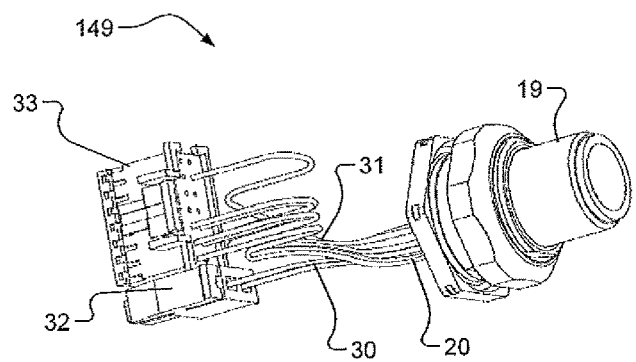
FIG. 12A
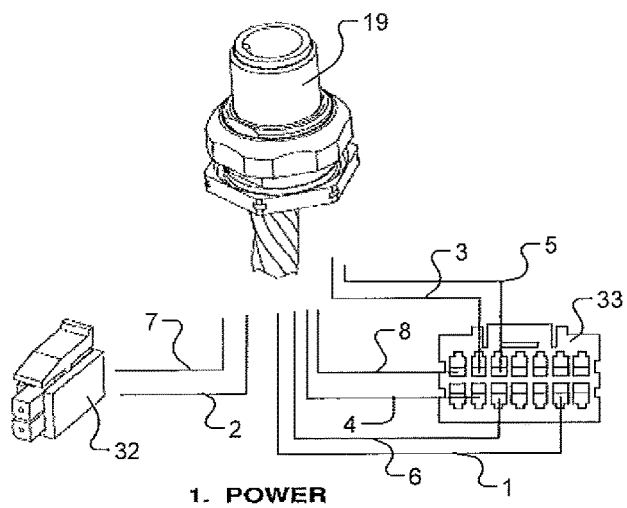
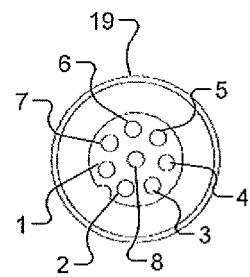
FIG. 12C
1. POWER
2. GROUND
3. OPEN
4. CLOSE
5. OPEN SENSE
6. CLOSE SENSE
7. ANALOG FORCE
8. I/O POWER
FIG. 12B

ELECTRIC MOTOR BASED HOLDING CONTROL SYSTEMS AND METHODS

CROSS-REFERENCE TO RELATED APPLICATIONS

This application is a divisional of U.S. patent application Ser. No. 13/525,436, filed Jun. 8, 2012, which claims priority to U.S. patent application Ser. No. 61/501,418, filed Jun. 27, 2011. The entire disclosures of the above applications is are incorporated herein by reference.

FIELD

The present disclosure relates to holding control systems, and more particularly to control systems for electrically actuated holding devices, such as grippers and clamps.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Various holding systems are used in manufacturing to hold and/or move objects between locations. Example holding systems are gripper systems and work holding systems or systems that include clamps. Gripper systems are typically used for gripping and/or moving objects between locations. A gripping procedure may include four steps. During a first step, a gripper is closed to grip an object at a first location. During a second step, an external device (or actuator) moves the gripper from the first location to a second location. During a third step, the object is released from the gripper at the second location. During a fourth step, the external device moves the gripper back to the first location to pick up another object.

Work holding systems typically include one or more clamps that are actuated to hold a part. Each clamp may have, for example a hold state and a release state. During the hold state the clamp is actuated to and held in a part holding position. This prevents the part from moving relative to a fixture. During the release state the clamp is actuated to a backoff (or non-holding) position. This allows the part to be removed from the fixture.

Holding systems may be pneumatic-based or electric-based. The pneumatic-based holding systems include a pneumatic circuit. The pneumatic circuit may include a body and pneumatically actuated valves. The valves are opened and closed to adjust a pressure within a cylinder of the body. A piston is translated within the cylinder based on the pressure in the cylinder. Movement of the piston causes holding element(s) (e.g., gripper fingers or a clamp arm) to hold or release an object. In a gripper implementation, the gripper fingers may be in a closed (gripping) state or an open (release) state. In a clamp implementation, the clamp arm may be in a hold state or a release state. Sensors may be used to detect the state of the holding elements by monitoring position of the piston within the cylinder and/or by directly detecting position of the holding elements.

As a first example, the piston may include magnets, which may be detected via sensors externally mounted on the body. The body may include a groove that extends parallel to the direction of motion of the piston. Magneto-resistive sensors may be mounted on the body over the groove and detect movement of the magnets (i.e. movement of the piston). These sensors may be used to generate, for example, OPEN and CLOSE signals or HOLD and RELEASE signals for automation control. The signals indicate whether the holding elements are in the open, closed, hold and/or release states. As another example, externally mounted inductive sensors may be used to sense holding element movement (e.g., gripper jaw and/or finger movement).

Use of the externally mounted sensors has associated disadvantages. In addition to cost of the sensors and associated cables, the cables can degrade due to, for example, iterative cycling through a gripper procedure. Since a gripper is iteratively moved between locations, certain points on the cables can wear out and thus prevent use of the gripper. In addition, manual adjustments may be needed to swap out sensors on a holding system to accommodate objects of different size. Each object may have a respective set of associated sensors.

Electric-based holding systems may include one or more electric motors mounted on a body. The electric motor(s) are used to actuate holding elements. Sensors may be mounted on the body to detect state of the holding device. Similar issues can arise with these sensors as with the sensors of the pneumatic-based holding systems.

In addition, electric current supplied to the electric motor(s) may need to be maintained or adjusted in order to maintain a desired pressure on an object when holding elements are in a closed or hold state. A typical stepper motor may need to remain on (drawing full power) regardless of the location or movement of the holding elements. This can result in the electric motors being operated at increased temperatures for extended periods of time, which can limit maximum output torque levels of the electric motors and/or degrade and reduce operating life of components of the electric motors. Also, as current is maintained, power consumption is increased.

SUMMARY

A holding system is provided and includes a force control module configured to generate a force signal to cause a holding device to perform at least one of a hold stroke and a release stroke. The hold stroke includes transitioning a gripping element of the holding device to a first position to grip an object. The release stroke includes transitioning the gripping element to a second position to release the object. The holding device is non-backdrivable. A stall detection module is configured to (i) monitor a sensor signal received from a sensor of an electric motor assembly of the holding device and (ii) detect a first stall condition of an electric motor based on the sensor signal. A shut off module is configured to shut off current to the electric motor based on the detection of the first stall condition during or at an end of the release stroke.

In other features, a holding system is provided and includes a force control module configured to generate a force signal to cause a holding device to perform at least one of a hold stroke and a release stroke. A stall detection module is configured to (i) monitor a sensor signal received from a sensor of an electric motor assembly and (ii) detect a stall condition of an electric motor based on the sensor signal. A boosting module is configured to increase current to the electric motor to a boost current level and unbind a lead-screw of the electric motor assembly. The boost current level is greater than an applied current level. The applied current level is used to transition a gripping element of the holding device between a hold state and a release state. The boosting module, when boosting the current, is configured to adjust the force signal based on a direction of travel of the electric motor and the sensor signal.

In other features, a holding system is provided and includes a force control module configured to generate a force signal to cause a holding device to perform a release stroke. A gripping element of the holding device is actuated to release an object when the release stroke is performed. A stall detection module is configured to (i) monitor a sensor signal received from a sensor of an electric motor assembly and (ii) detect a stall condition of an electric motor based on the sensor signal. An end-of-travel module is configured to move the gripping element of the holding device away from a hard stop a predetermined distance including adjusting the force signal based on the detection of the stall condition.

In other features, a holding system is provided and includes a force control module configured to generate a first force signal to cause a holding device to perform at least one of a hold stroke and a release stroke. A stall detection module is configured to (i) monitor a sensor signal received from a sensor of an electric motor assembly and (ii) detect a stall condition of an electric motor based on the sensor signal at an end of the hold stroke or the release stroke. The force control module is configured to adjust the force signal to reduce current to the electric motor from a first current level to a second current level based on detection of the stall condition and while the holding device is holding an object. The second current level is greater than a minimum current level for holding the object.

In other features, a torque method of a holding device is provided. The method includes: determining a minimum output torque and a maximum output torque of a motor of the holding device; assigning a maximum voltage to the minimum output torque; assigning a minimum voltage to the maximum output torque; interpolating output torques between the minimum output torque and the maximum output toque based on the minimum voltage and the maximum voltage; operating the holding device in an applied torque mode based on the interpolated output torques, wherein the holding device is performing one of a hold stroke and a release stroke when in the applied torque mode; and providing the motor with the minimum voltage when operating in a hold mode, wherein during the hold mode the holding device is in a stall condition.

In other features, a holding system is provided and includes a holding device control module configured to (i) provide a power output and (ii) generate an open signal, a close signal, and a force signal. The force signal indicates a requested output torque of an electric motor. A motor control module is configured to generate feedback signals indicating a stall condition of the holding device. The feedback signals are generated by a sensor mounted within a housing of the electric motor. The holding system further includes a cable assembly. The cable system includes a first connector configured to connect to the holding device control module via a cable. The cable is connected between the holding device control module and the cable assembly. A second connector is connected to the motor control module and provides the open signal and the close signal from the holding device control module to the motor control module. The second connector provides the feedback signals from the motor control module to the holding device control module. A third connector is connected to the motor control module and providing the power output or the force signal from the holding device control module to the motor control module. Signal lines, separate from the cable, are connected between the (i) first connector and (ii) at least one of the second connector and the third connector.

Further areas of applicability of the present disclosure will become apparent from the detailed description, the claims and the drawings. The detailed description and specific examples are intended for purposes of illustration only and are not intended to limit the scope of the disclosure.

DRAWINGS

The present disclosure will become more fully understood from the detailed description and the accompanying drawings, wherein:

FIG. 12A is a perspective view of a cable assembly in accordance with the present disclosure;

Figure 13:
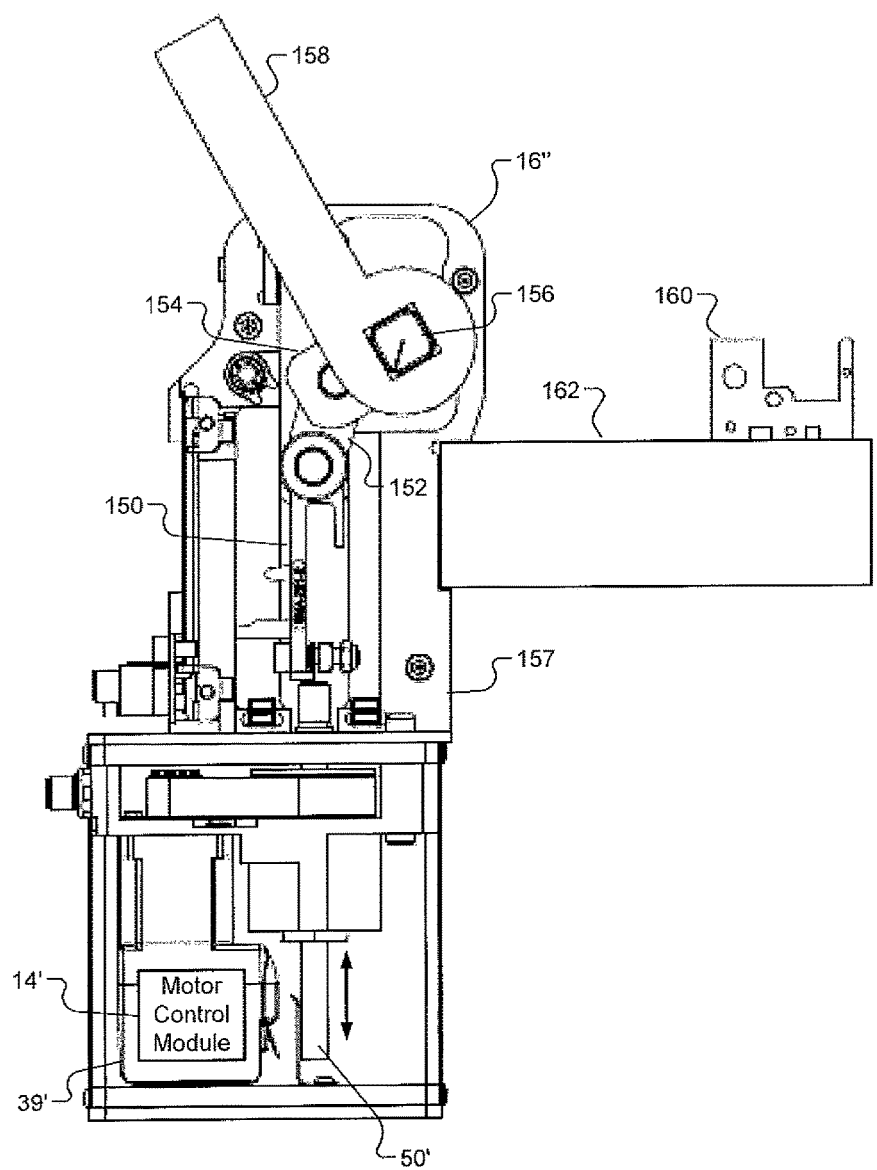
Figure 14:
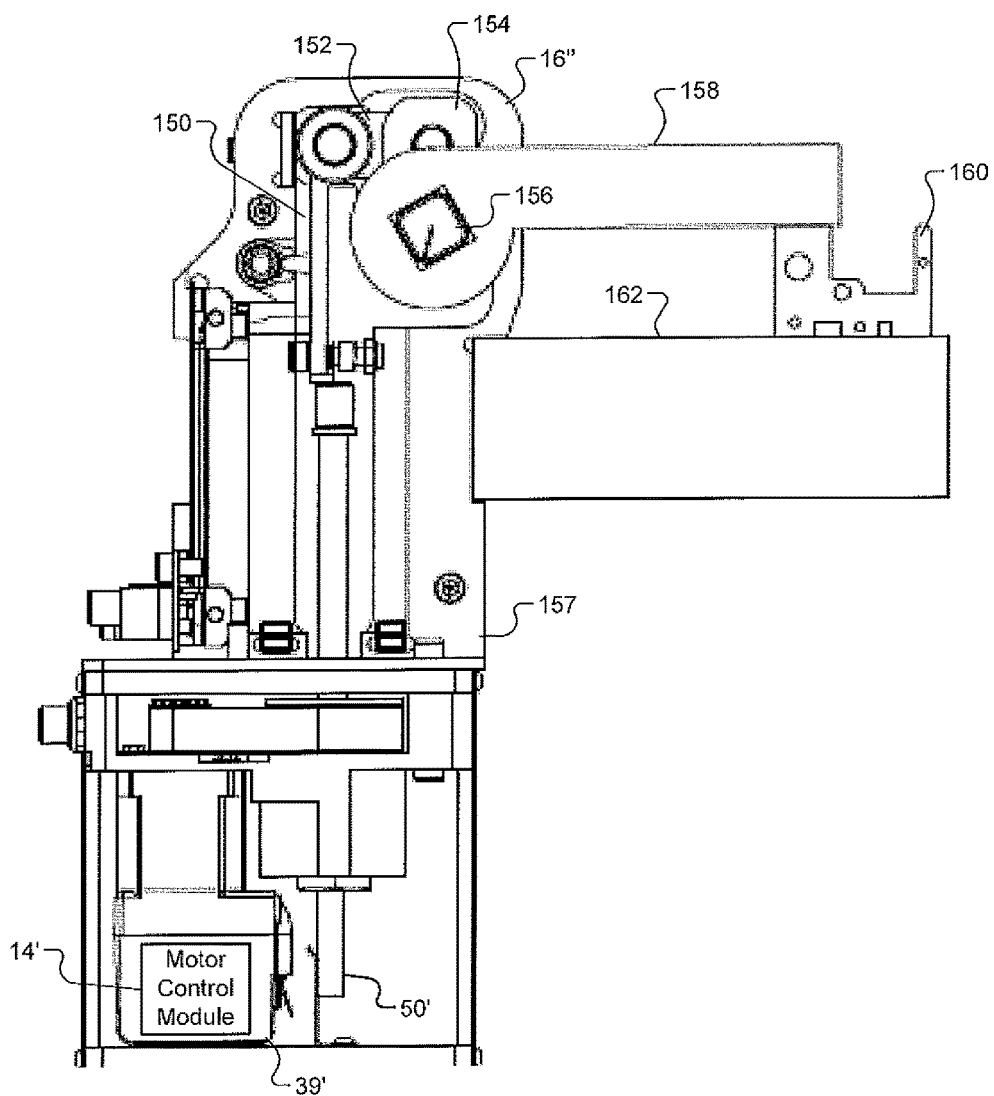
Figure 15:
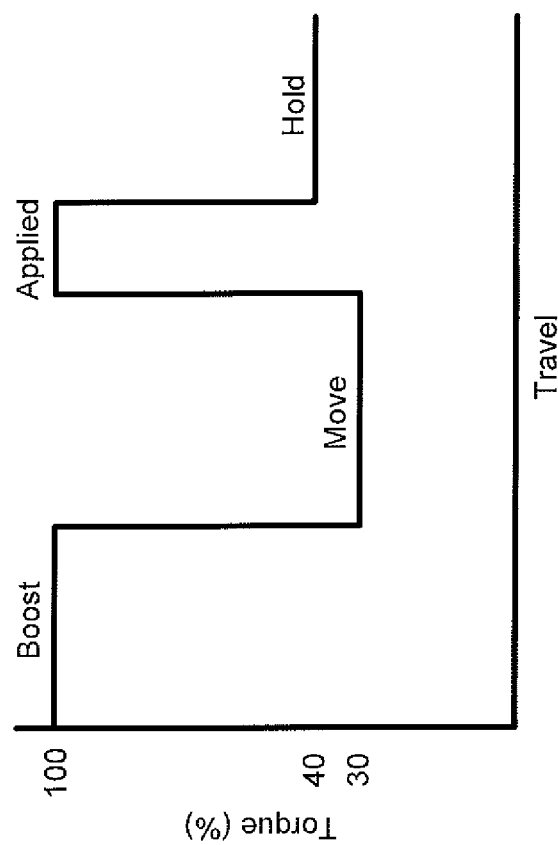
Figure 16:
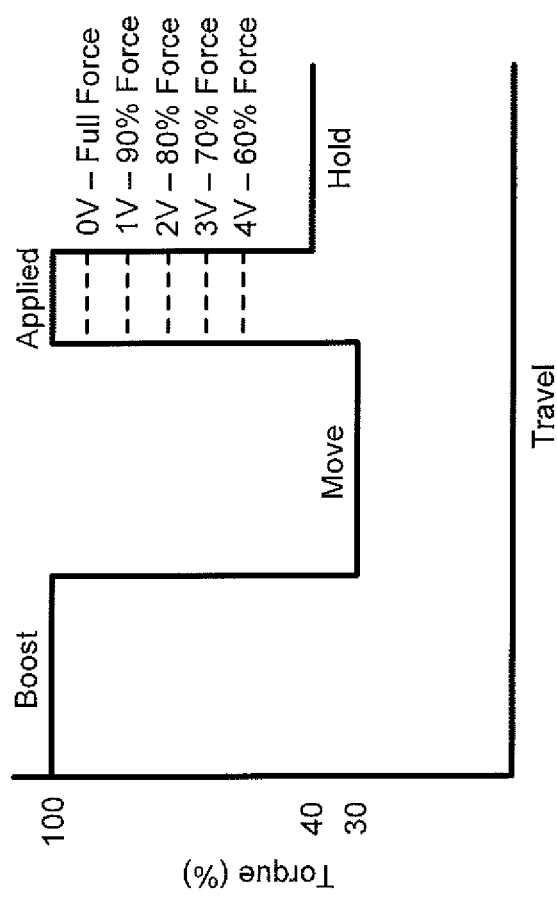
Figure 17:
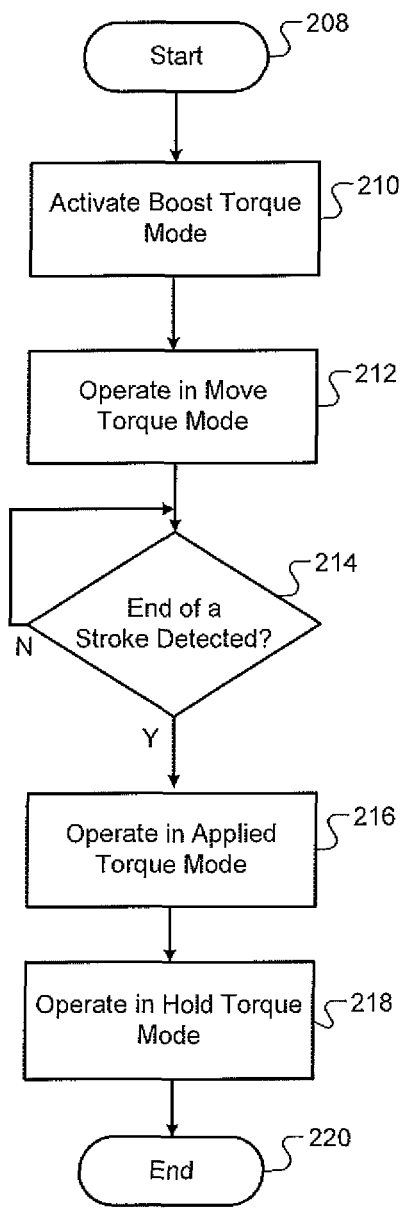

FIG. 12B includes perspective views and pin outs of connectors of the cable assembly of FIG. 12A;

FIG. 12C is a front view and pin out of a connector of the cable assembly of FIG. 12A;

FIG. 13 is a cross-sectional view of a clamp in a release state and in accordance with the present disclosure;

FIG. 14 is a cross-sectional view of the clamp of FIG. 13 in a hold state;

FIG. 15 is a torque plot illustrating a move mode in accordance with the present disclosure;

FIG. 16 is a torque plot illustrating multiple applied modes in accordance with the present disclosure; and FIG. 17 illustrates another gripping method in accordance with the present disclosure.

DETAILED DESCRIPTION

In the following description, grippers are primarily described as gripping an object when in a closed state and releasing an object when transitioning from a closed state to an open state. In certain gripper applications a gripper may grip an object when in an open state and release an object when transitioning from an open state to a closed state. Thus, the following described implementations may also be applied to grippers that grip an object when in an open state.

Figure 1:
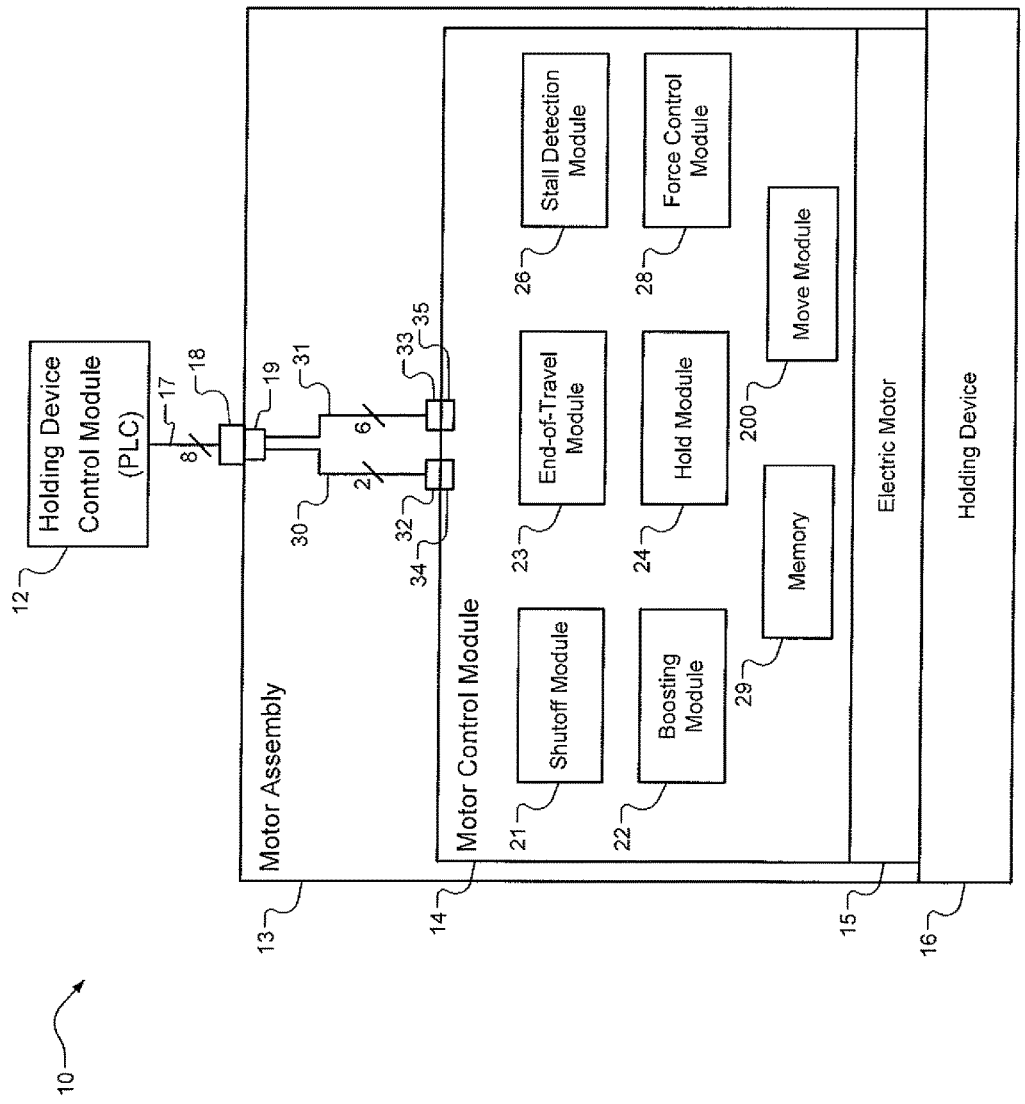
FIG. 1 is a functional block diagram of an electric-based holding system in accordance with the present disclosure.

In FIG. 1, an electric-based holding system ("holding system") 10 is shown and includes a holding device control module 12, a motor assembly 13 with a motor control module 14 and an electric motor 15, and a holding device 16.

The holding system 10 may be referred to, for example, as a gripper system or a clamp system. The holding device 16 may be, for example, a gripper or a clamp having one or more gripping element(s). The holding device control module 12 is connected to the motor assembly 13 via a flex cable 17. The flex cable 17 includes a first connector 18 that is connected to a second connector 19 on the motor assembly 13. The second connector 19 is part of a cable assembly 20, which is internal to the motor assembly 13. The cable assembly 20 simplifies an interface between the holding device control module 12 and the motor control module 14. The configuration of the flex cable 17 and the cable assembly 20 provides ease in connecting the holding device control module 12 to the motor control module 14.

The flex cable 17 may be highly flexible. As an example, the flex cable 17 may have a bending radius of less than or equal to 15 times the outer diameter (OD) of the flex cable 17 (or 15×OD). In one implementation, the bending radius of the flex cable 17 is 10×OD. The bending radius may be determined at any point along the cable. The high flexibility of the flex cable 17 prevents breakdown of the cable 149 during use. The flex cable 17 may have a bending cycle life of, for example, greater than or equal to 20 million cycles. Although not shown in FIGS. 12A-12C, the flex cable 17 may include a center core, chords, a sheath, a ground shield, etc. The flex cable 17 may include thermoplastic elastomer (TPE), polyurethane (PUR), polytetrafluoroethylene (PTFE) and/or nylon to provide flexibility, abrasion resistance and resistance to hydraulic fluids and hydrocarbons. Conductors of the flex cable 17 may be formed of, for example, gold (Au), nickel (Ni), brass, copper (Cu), zinc (Zn) and/or other electrically conductive materials.

The holding device control module 12 may be a programmable logic controller (PLC) and commands OPEN and CLOSE or HOLD and RELEASE states of the holding device 16. The motor control module 14 controls operation of the electric motor based on power and discrete input and output (I/O) control signals from the holding device control module 12. The motor control module 14 may be programmable and may include a shut off module 21, a boosting module 22, an end-of-travel module 23, a hold module 24, a stall detection module 26 and a force control module 28. The modules 21-28 are provided as an example, one or more of the modules 21-28 may be combined in a single module or excluded from the motor control module 14. For example, the force control module 28 may include the shut off, boosting and/or hold modules 21, 22, 24. The motor control module 14 may also include a memory 29 for storing various software algorithms and routines, predetermined values, thresholds, set points, voltages, current values, etc. disclosed below.

The cable assembly 20 includes the second connector 19, a first set of wires 30, a second set of wires 31, a third connector 32, and a fourth connector 33. The first set of wires 30 is connected between the second connector 19 and the third connector 32. The second set of wires 31 is connected between the second connector 19 and the fourth connector 33. The third connector 32 is connected to a fifth connector 34 on the motor control module 14. The fifth connector 34 may be connected to the motor control module 14 as shown or may be connected to directly to the electric motor 15. The fourth connector 33 is connected to a sixth connector 35 on the motor control module 14.

Figure 2:
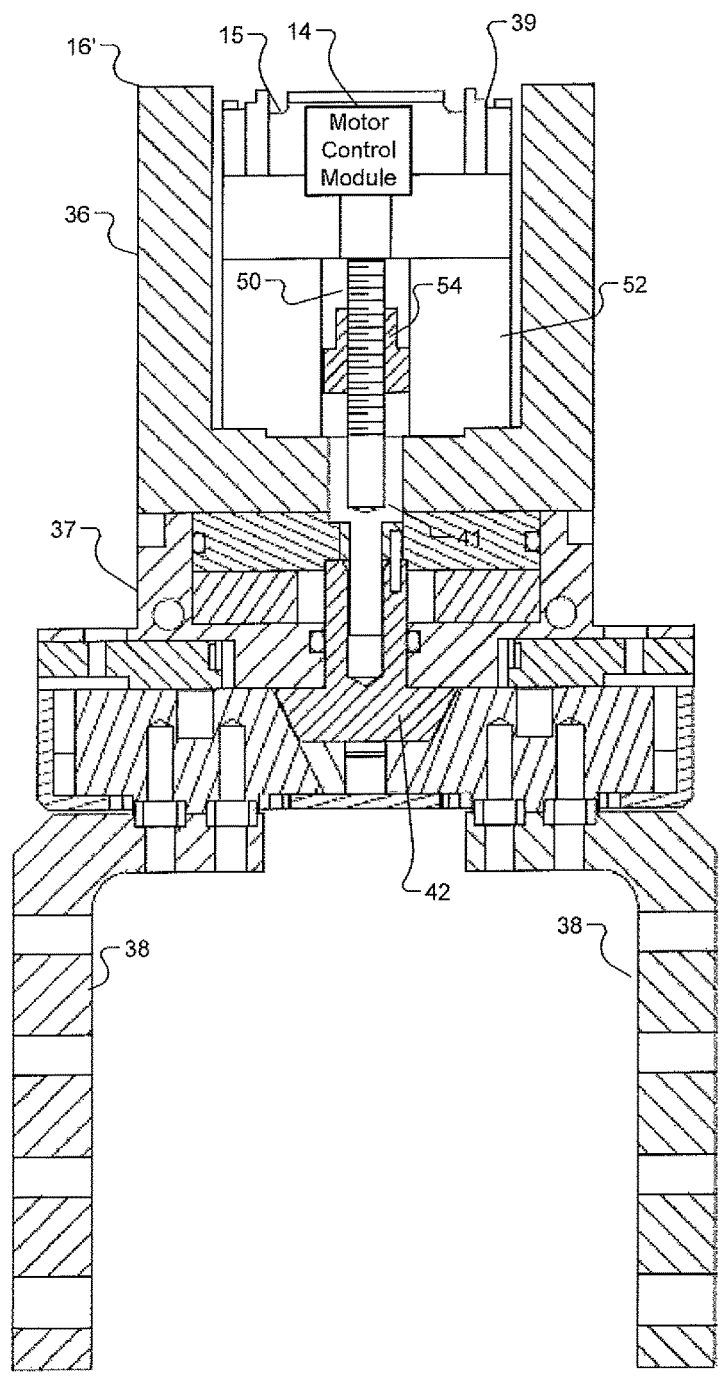
FIG. 2 is a cross-sectional view of a gripper in accordance with the present disclosure.

Operation of each of the modules 14 and 21-28 is described in detail below with respect to FIGS. 2-14. Examples of the holding device 16 are shown in FIGS. 2, 13 and 14 and an example of the cable assembly 20 is shown in FIGS. 12A-12C. Although the following implementations of FIGS. 2-11 are primarily described with respect to a gripper, the implementations may be modified and/or applied to other holding devices. An example of another holding device is provided in FIGS. 13 and 14.

Referring now also to FIG. 2, a holding device 16' is shown. The holding device 16' is a gripper and includes a motor stand 36, a gripper body 37, and fingers (or gripping elements) 38. An electric motor assembly ("the motor") 39 is mounted on the motor stand 36 and drives a coupling 41 to move a wedge 42 in the gripper body 37. The motor 39 includes the motor control module 14 and the electric motor 15, which are mounted within a housing 52 of the motor 39. A combination of the motor 39 and the gripper body 37 may be referred to as a linear actuator. Translation of the wedge 42 moves the fingers 38 between open and closed states. The motor 39 may include a leadscrew 50 that is driven in and out of the housing 52 of the motor 39 via a rotor (or motor) nut 54. The leadscrew 50 does not rotate and the rotor nut 54 rotates in a fixed position relative to the housing 52.

The direction of travel of the leadscrew 50 is based on the rotating direction of the rotor nut 54. Driving the leadscrew 50 into the housing 52 causes the coupling 41 to pull the wedge 42 in an inward direction and toward the electric motor 15 thereby causing the finger 38 to move to a closed state, as shown. The fingers 38 may be in a fully open state when the leadscrew 50 is driven out of the housing 52.

The motor 39 may include one or more internal sensors (not shown) for detecting position of the leadscrew 50, which indicates position of the fingers 38. As an example, the motor 39 may include an encoder or other sensors (not shown) that detects position of the leadscrew 50. The encoder and/or internal sensors may be monitored by the stall detection module 26 and provide feedback (e.g., position information) indicating whether the fingers 38 are in an OPEN or a CLOSED state. The motor control module 14 and/or the stall detection module 26 may generate OPEN SENSE and CLOSE SENSE signals, which indicate the OPEN and CLOSED states and are provided on OPEN SENSE and CLOSE SENSE lines (examples of which are shown in FIGS. 12A-12C). The OPEN and CLOSE states and the OPEN SENSE and CLOSE SENSE signals lines may refer to HOLD and RELEASE states and/or HOLD SENSE and RELEASE SENSE signal lines. The OPEN and CLOSED states may be based on whether the leadscrew 50 is at a hard stop. A hard stop refers to when the fingers 38 are against an object and are no longer moving and/or when, for example, components of the motor 39 (e.g., the leadscrew 50, the coupling 41 and/or the wedge 42) have reached a travel limit. This may occur, for example, when the fingers 38 have closed or opened and gripped an object or when the fingers 38 have moved to an end-of-travel limit.

The implementations described herein with respect to the modules 14 and 21-28 may be applied to electric motors of various types. As such, the electric motor 15 may be of various types. As a couple of examples, the electric motor 15 may be a rotary motor or a linear motor. The electric motor 15 may be a stepper motor, a brush motor, a brushless motor, etc. As a further example, the electric motor 15 may be an anti-stall stepper motor.

Internal Sensor Simulation

Traditional pneumatic and/or electric based grippers typically include externally mounted sensors for detecting open and close positions of the grippers. Externally mounted sensors refer to sensors mounted on a body of a gripper system external to a motor and/or a motor housing. Use of externally mounted sensors has associated disadvantages. Stall detection methods described herein can be used to detect open and closed states of a gripper without the use of externally mounted sensors.

A stall condition may result when the leadscrew 50 has reached a hard stop. A stall condition refers to when power is provided to translate the leadscrew 50, but the leadscrew 50 is not moving due to the hard stop preventing further movement. The motor control module 14 and/or stall detection module 26 may detect stalled conditions and indicate this via the OPEN and CLOSE (or HOLD and RELEASE) SENSE signal lines. In one implementation, the stall detection module 26 detects the stalled conditions and may generate a stall signal and/or sets a stall flag, which may be stored in the memory 29. The motor control module 14 may generate the OPEN SENSE and CLOSE SENSE signals based on the stall signal and/or set flag.

The stalled conditions may be detected based on current and/or voltage applied to the electric motor 15, a direction of travel of the fingers 38, signals from an encoder, and/or signals from internal sensor(s). The internal sensors may be disposed within the motor housing 52. As an example, the stalled conditions may be detected by sensing positions and/or rotation of an encoder mounted internal to the motor housing 52. The OPEN and CLOSE SENSE signal lines may provide digital and/or HIGH/LOW sensor signals indicating whether the holding device 16' is stalled and is in an open or closed state.

The OPEN and CLOSE SENSE signals may be provided on output pins of the second connector 19 and detected by the holding device control module 12. The OPEN and CLOSE SENSE signals can be used to simulate and/or provide information typically provided by normally open or normally closed externally mounted sensors (e.g., PNP or NPN transistor based sensors). This removes the need for external sensors and resolves issues associated therewith.

Backdrivable Versus Non-Backdrivable

The linear actuator, the holding device 16 and/or the leadscrew 50 may be backdrivable or non-backdrivable based on the pitch of the leadscrew 50. The linear actuator, the holding device 16 and/or the leadscrew 50 are backdrivable when power to the electric motor 15 is shut off (or removed) and the leadscrew 50 moves due to pressures between the fingers 38 and an object being held by the fingers 38. Pitch of the leadscrew 50 may be based on the gripper application of use. The pitch of the leadscrew 50 refers to the number of threads per predetermined length of the leadscrew 50. A fine leadscrew has more threads per predetermined length than a coarse leadscrew. A fine leadscrew may not be backdrivable due to the forces required to overcome friction between, for example, the leadscrew and the rotor nut 54. A coarse leadscrew may be backdrivable, as the forces required to overcome friction are less.

Motor Shut Off

In a gripper application that includes the use of a fine leadscrew, the shut off module 21 may shut off power to the electric motor 15 to conserve energy. For example, the power to the electric motor 15 may be removed when the holding device 16' has gripped an object and/or has reached a hard stop.

As a fine leadscrew is non-backdrivable, power may be removed while maintaining a desired grip (or hold) force on the object. A leadscrew with a desired pitch may be selected based on a rated force level. The rated force level refers to the force to hold an object plus a safety margin. As a result, the force to overcome friction and backdrive the selected leadscrew is more than the force to hold the object. This enables failsafe operation by preventing an object from being dropped when power is removed. In addition to removing power to the electric motor 15, power may also be partially or fully removed from the holding device control module 12 and/or the motor control module 14.

As an example, the shut off module 21 shuts off power to the holding device control module 12, the electric motor 15, and/or the motor control module 14 when the motor 39 completes an Open, Close, Hold and/or Release transitional movement (or stroke). Grip force is maintained since the selected leadscrew is non-backdrivable. The shut off module 21 may implement a stall detection routine to detect when to shut off the power. The shut off module 21 may receive and continuously monitor the OPEN SENSE signal, the CLOSE SENSE signal and/or other signals from the motor 39 (or encoder and/or other internal sensors) when a command has been issued to transition between the OPEN and CLOSED states. The OPEN and CLOSE SENSE signals are generated independent of stroke position (i.e. positions of the fingers 38).

The shut off module 21 may detect a stall condition based on the OPEN and CLOSE SENSE signals and start a counter. If the counter reaches a predetermined threshold, a flag is set that enables execution of a motor shut off routine. The motor shut off routine may shut off current and/or voltage to the electric motor 15 and/or other elements of the holding system 10. The shut off module 21 may shut off power to the motor 39 and/or the electric motor 15 by removing power to POWER and/or POWER I/O pins of the motor 39. These pins are shown in FIGS. 12B-12C. The backdrivable leadscrew maintains force and position of fingers 38 when the power is off.

A gripping process may include 4 steps. The 4 steps include: 1) gripping an object (i.e. closing or opening gripper fingers) at a first location; 2) moving the gripper from a first location to a second location; 3) releasing the object (i.e. performing the opposite motion with the gripper fingers as in step 2); and 4) moving the gripper back to the first location to pick up a next object. With the motor shut off routine enabled, the shut off module 21 may shut off power to the electric motor 15 and/or other elements of the holding system 10 for a duration of the $2^{nd}$ and $4^{th}$ steps. This can reduce energy consumption and heat generation by as much as 50% (relative to an electric-based gripper system without motor shut off control) when durations of each of the 4 steps are equal in length. As a result, less energy is consumed during each cycle of the gripping process while heat generation is reduced. Reduced heat generation allows a motor to be driven harder (commanded to output larger torque levels for increased periods of time). With less power consumed, the holding system 10 is cheaper to operate relative to traditional holding systems and allows for increased output torque (or gripping forces) to be generated.

The holding system 10 may be operated using numerous methods, example methods are provided by the methods of FIGS. 3, 5, 7, 9, 11 and 17. The below-described tasks of FIGS. 3, 5, 7, 9, 11 and 17 are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

Figure 3:
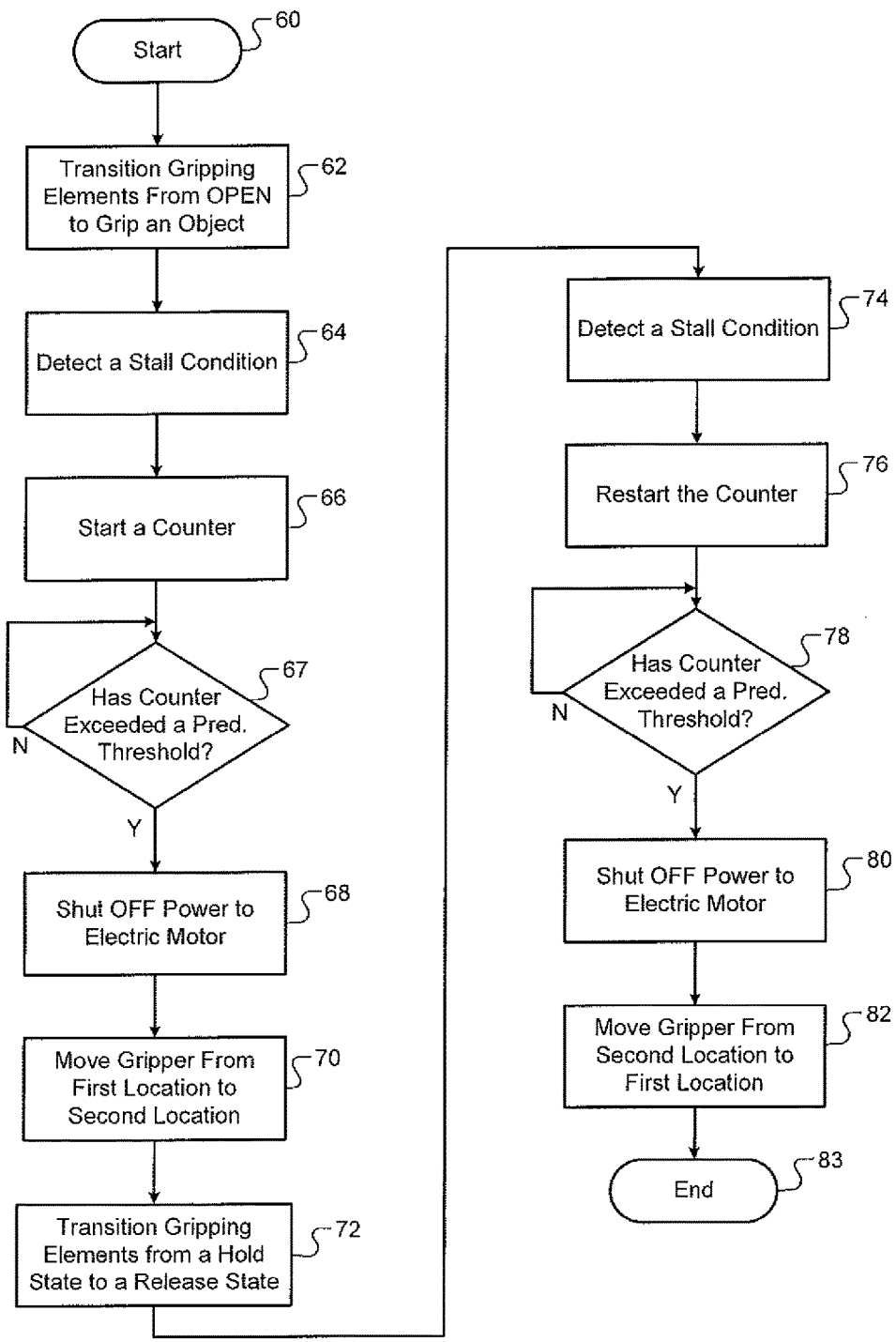
FIG. 3 illustrates a motor shut off method in accordance with the present disclosure.

In FIG. 3, a motor shut off method is shown. Although the following tasks are primarily described with respect to the implementations of FIGS. 1-2, the tasks may be easily modified to apply to other implementations of the present disclosure. The tasks may be iteratively performed. The method may begin at 60.

At 62, the motor control module 14 transitions gripping elements of a gripper to an OPEN or CLOSED state to grip an object at a first location. This includes performing a hold stroke. At 64, the shut off module 21 monitors the OPEN and CLOSE SENSE signals and detects a stall condition at an end of the hold stroke.

At 66, the shut off module 21 starts a counter. At 67, the shut off module 21 determines whether the counter has reached the predetermined threshold. If the threshold is reached, task 68 is performed. At 68, the shut off module 21 shuts off current and/or voltage to the electric motor 15.

At 70, the gripper including motor assembly 13 are moved from a first location to a second location. This includes the shut off module 21 turning on and/or permitting the electric motor 15 to be turned on. At 72, the motor control module 14 transitions the gripping elements from a hold state to a release state by performing a release stroke.

At 74, the shut off module 21 monitors the OPEN and CLOSE SENSE signals and detects a stall condition at an end of the release stroke.

At 76, the shut off module 21 resets and starts the counter. At 78, the shut off module 21 determines whether the counter has reached the predetermined threshold. If the threshold is reached, task 80 is performed. At 80, the shut off module 21 shuts off current and/or voltage to the electric motor 15.

At 82, the gripper including the motor assembly 13 is moved from the second location to the first location. The method may end at 83 or may return to task 60.

Motor Boosting

A binding situation can occur under certain conditions when a non-backdrivable leadscrew is used. Binding refers to when a leadscrew (e.g., the leadscrew 50) binds (becomes stuck together) with a nut of an electric motor (e.g., the rotor nut 54). This can occur when the linear actuator is driven into a hard stop, which stalls the electric motor 15. In this scenario, a torque mode algorithm is used to sense the stalled motor and apply a motor control signal to generate a predetermined amount of output torque. The torque mode algorithm may be executed by, for example, the force control module 28. The output torque is produced to provide an adequate level of pressing force on the object by the fingers 38 thereby holding the object when at a hard stop. This allows the motor 39, in addition to being used for positioning an object, to also be used for holding an object when at a hard stop.

The rotor of the motor 39 is static (i.e. stationary) when the motor control module 14 (or force control module 28) commands the output torque to continue pressing on a hard stop. A force signal FORCE may be originally supplied from the holding device control module 12 to the motor control module 14. The motor control module 14 may adjust the current received by the electric motor 15 based on the force signal FORCE. The continued pressing action causes the leadscrew 50 and the rotor nut 54 to be wedged into or against the hard stop. As a result, the leadscrew 50 binds with the rotor nut 54.

The longer the leadscrew 50 and the rotor nut 54 are in a binded state, the more force needed to break free the leadscrew 50 and/or the rotor nut 54. The leadscrew 50 and the rotor nut 54 may remain in a binded state for extended periods of time, for example, when the holding device 16' is driven to a fully closed or open position during assembly and remains in that state until used by a customer. If the holding device 16' is actuated immediately after being driven into a binded (or wedged) state, the tendency for the leadscrew 50 and the rotor nut 54 staying bound is virtually non-existent.

Figure 4:
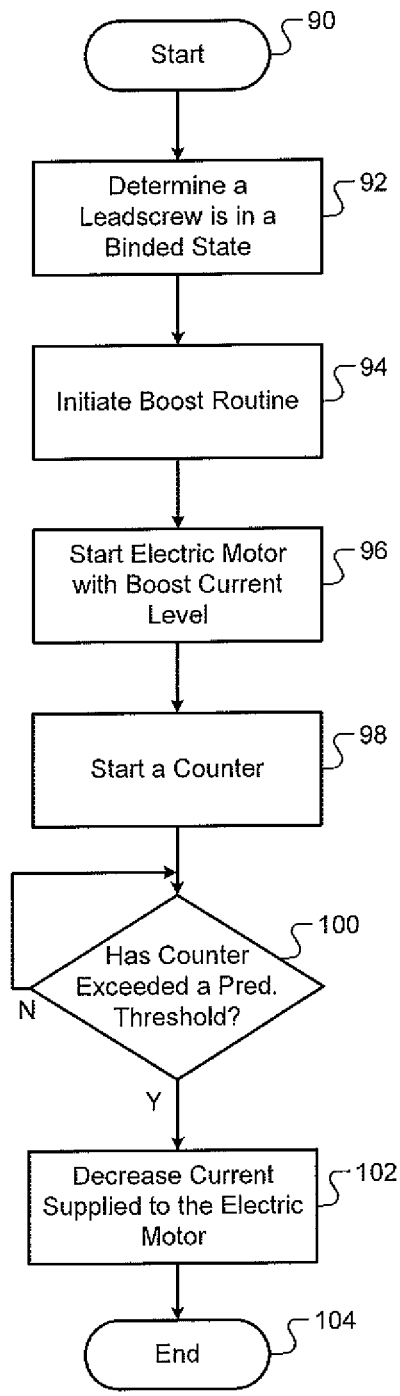
FIG. 4 illustrates a boosting method in accordance with the present disclosure.

Referring now also to FIG. 4, a boosting method is shown. The boosting module 22 may boost output torque of the electric motor 15 during a boost mode to unbind the leadscrew 50 and/or the rotor nut 54. Although the following tasks are primarily described with respect to the implementations of FIGS. 1-2, the tasks may be easily modified to apply to other implementations of the present disclosure. The tasks may be iteratively performed. The method may begin at 90.

At 92, the stall detection module 26 determines that the leadscrew 50 is in a binded stated against a hard stop, as described herein. At 94, the boosting module 22 initiates a boost routine when initially signaling the electric motor 15 to move the fingers 38 (or gripping elements) from a hard stop position associated with the hard stop.

At 96, the motor control module 14 and/or the boosting module 22 in executing the boost routine starts the electric motor 15 with an increased or predetermined level of current (boost current level), which provides a boosted output torque.

At 98, the boosting module 22 may start a counter. At 100, the boosting module determines whether the counter has expired (i.e. exceeded a predetermined threshold). Task 102 may be performed when the counter has expired. Tasks 96-102 are performed to apply the boost current for a short predetermined period (boost period) to break free the leadscrew 50 and/or the rotor nut 54. The predetermined threshold and/or boost period may be set based on an amount of time that the leadscrew 50 and/or rotor nut 54 were in a binded state. The predetermined threshold and/or boost period are set to assure that the binded state is overcome.

At 102, the force control module 28 decreases the current supplied to the electric motor 15 to an applied current level providing an output toque that is less than the boosted output torque. The applied current level is the current level used to grip (or hold) the object. The boosting method may end at 104.

Figure 5:
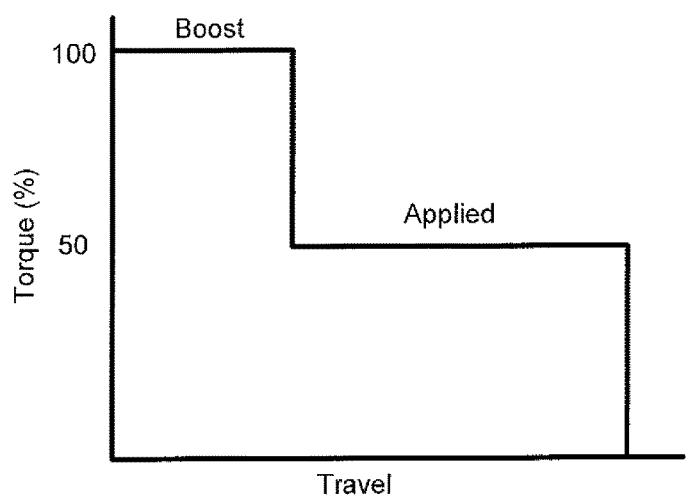
FIG. 5 is a torque plot illustrating a boost mode in accordance with the present disclosure.

An example of a torque plot illustrating the boost mode is shown in FIG. 5. In FIG. 5 a first torque level is shown for when the boost current is supplied and an applied torque is shown for when the applied current level is supplied. The boost current level may be set at, for example, a 100% output current level corresponding to a 100% output torque level of the electric motor 15, and/or may be set based on the applied current level. The boost period may be set to ensure enough time to overcome binds in worst case situations. The boost current level may be set to be a predetermined amount of current more than the applied current level to effectively eliminate a bind. This ensures the force applied during an applied torque mode (applied force) is not too large to prevent a bind created based on the applied force from being overcome during the boost mode.

Although the boost mode overcomes binded states of a motor, accounting for binds and incorporating use of a boost mode can effectively decrease usable force and stroke of the motor. Since an increased level of force is needed to overcome a binded state created through the use of an applied force, the applied force is set at a level that is less than a maximum output force level of the motor.

The boost mode is used when at a hard stop and when initially transitioning from an open state or from a closed state. The fingers 38 are moved from a hard stop position to a non-binded position. As a result, the stroke associated with the applied mode is decreased, since the fingers 38 are moved from the hard stop positions during the boost mode. Although the usable stroke is decreased, the amount of reduction is minimal, as the binded state is overcome when the fingers 38 or other gripper components are moved off the hard stop.

If the boost mode is activated while closing the fingers 38 to grip (or hold) an object, the object may be gripped with a maximum force, which may not be decreased when switching from the boost mode to the applied current mode. This not only applies too much force on the object, but also creates a worst case binding condition, as the force applied on the object is a maximum force. Thus, the object is not gripped during the boost mode, which reduces the usable stroke of the electric motor 15.

End-Of-Travel Move

Figure 6:
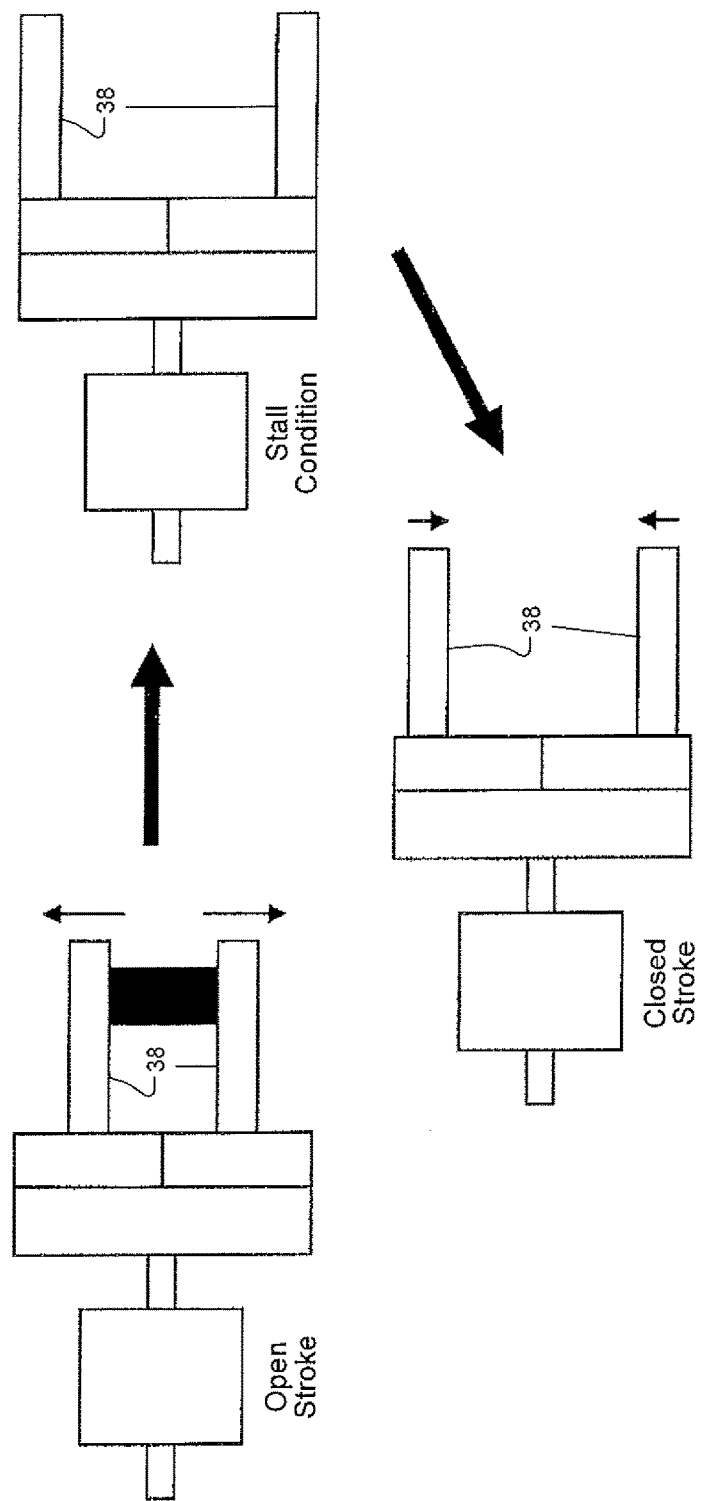
FIG. 6 is a diagram illustrating an end-of-travel routine and corresponding gripper finger states in accordance with the present disclosure.

Referring now also to FIG. 6, an end-of-travel routine is illustrated. The fingers 38 are shown during an open stroke, at a hard stop in a fully open state (stall condition), and during a close stroke. The end-of-travel module 23 may move the fingers 38 and/or other components of the holding device 16' away from a hard stop to prevent binding. The end-of-travel module 23 prevents binding by ensuring that the leadscrew 50 does not remain in a hard stop position. As an example, an outer diameter (OD) style gripper that applies a grip (or hold) force when closing fingers to grip an object does not need to remain on a hard stop when opening the fingers. Therefore, the end-of-travel module 23 may detect a hard stop at the end of an open stroke and move the fingers 38 and/or other components of the holding device 16' away from the hard stop. The end-of-travel module 23 may detect the hard stop based on, for example, the OPEN SENSE signal.

If the move away from the hard stop is done upon detecting the hard stop, binding does not occur and/or is minimized. The end-of-travel module 23 may move the fingers 38 and/or other components of the holding device 16' a predetermined distance (0.002 of an inch) away from the hard stop to prevent binding and minimize the amount of usable stroke reduction.

The end-of-travel routine is not performed when gripping an object, but rather is used at an end of a transition from a grip or hold (e.g., closed) state to a release (e.g., open) state. A movement of the fingers 38 (e.g., 0.002 of an inch) off an object results in zero grip force.

The end-of-travel routine may be used in applications where the unit movement is based on external hard stops and a pressing force is not needed at the hard stops to grip an object. For these applications, the holding device 16' simply provides enough force to overcome a non-binded position. An example application may include the use of the holding device 16' to push an object, as opposed to gripping an object. In these applications, the end-of-travel move from a hard stop may be used on both open and close movements.

Figure 7:
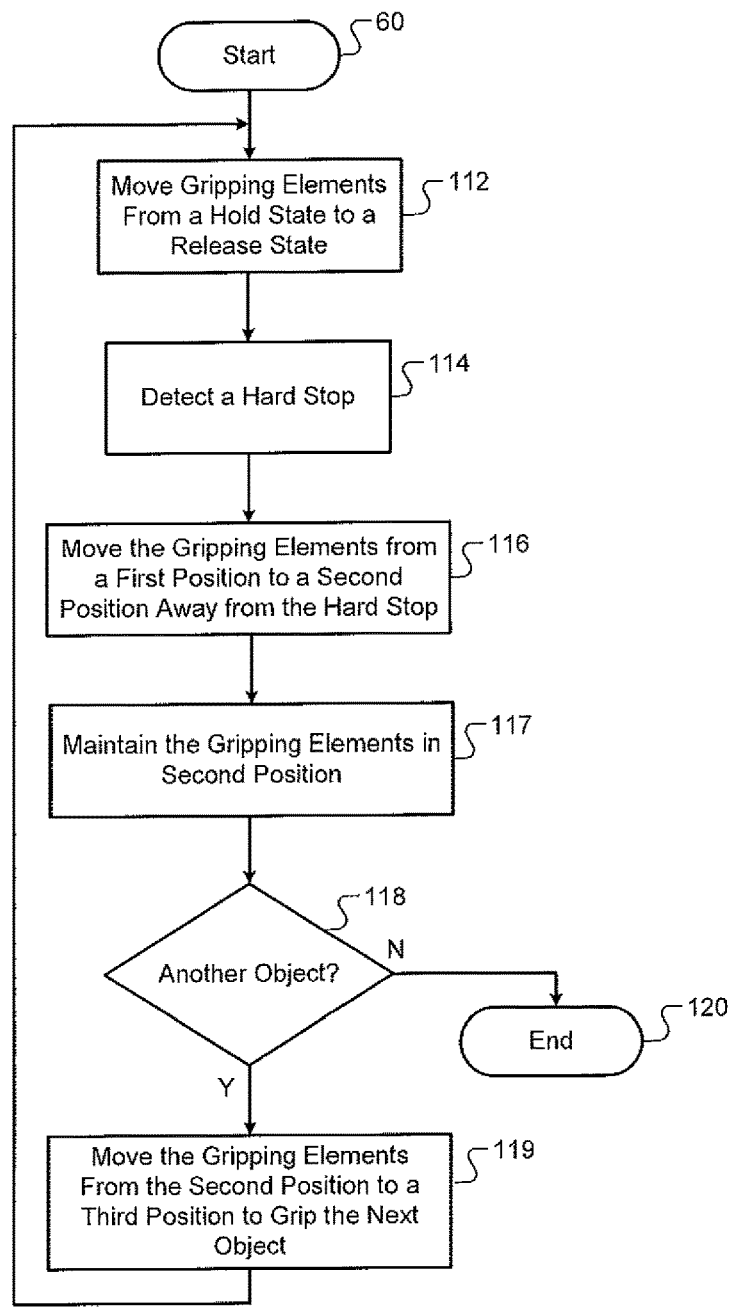
FIG. 7 illustrates an end-of-travel method in accordance with the present disclosure.

In FIG. 7, an end-of-travel method is shown. The end-of-travel method may be performed for gripping systems having a backdrivable leadscrew or a non-backdrivable leadscrew. Although the following tasks are primarily described with respect to the implementations of FIGS. 1-2 and 6, the tasks may be easily modified to apply to other implementations of the present disclosure. The tasks may be iteratively performed. The method may begin at 110.

At 112, the end-of-travel module 23 and/or motor control module 14 may move gripping elements from a hold (or grip) state to a release state.

At 114, the stall detection module 26 and/or the end-of-travel module 23 may detect a hard stop at an end of a release stroke and subsequent to releasing an object, as described herein.

At 116, the end-of-travel module 23 upon detecting the hard stop may move the gripping elements from a current (or first) position to a second position that is away from the hard stop. The second position may be a predetermined distance from the first position (or hard stop position).

At 117, the motor control module 14 maintains the gripping elements in the second position. If the leadscrew is non-backdrivable, the motor control module 14 may shut off the electric motor 15.

At 118, the holding device control module 12 and/or the motor control module 14 may determine whether there is another object to grab and/or may receive a request to grab a next object. Task 119 may be performed when there is another object to grab, otherwise the method may end at 120.

At 119, the motor control module 14 moves the gripping elements from the second position to a third position to grip the next object. This may occur subsequent to the motor assembly 13 and the holding device 16 being moved from a current position to a pick-up position. Subsequent to task 119, task 112 may be performed. Task 112 may be performed after the motor assembly 13 and the holding device 16 are moved from a current (or the pick-up) position to a resultant (or drop off) position.

Hold Mode

As an alternative to using a non-backdrivable leadscrew, a backdrivable leadscrew may be used. Although backdrivable leadscrews do not have binding issues associated with non-backdrivable leadscrews, backdrivable leadscrews can move when power is removed. For this reason, power is not removed when using a backdrivable leadscrew to maintain a gripping force on an object. This grip force may be maintained when the holding device 16' is at a hard stop.

Maintaining a motor current at high (gripping) levels for extended periods can quickly lead to heat issues within the motor 39. The motor 39 may automatically shut off when temperature of the motor 39 exceeds a predetermined internal temperature (e.g., 85° C.). The motor 39 when operated at room or ambient temperature to produce an output torque of greater than or equal to a predetermined torque level (e.g., greater than or equal to 80% output torque) for extended periods can result in temperature of the motor exceeding the predetermined internal temperature. This may result in the motor shutting off.

Figure 8:
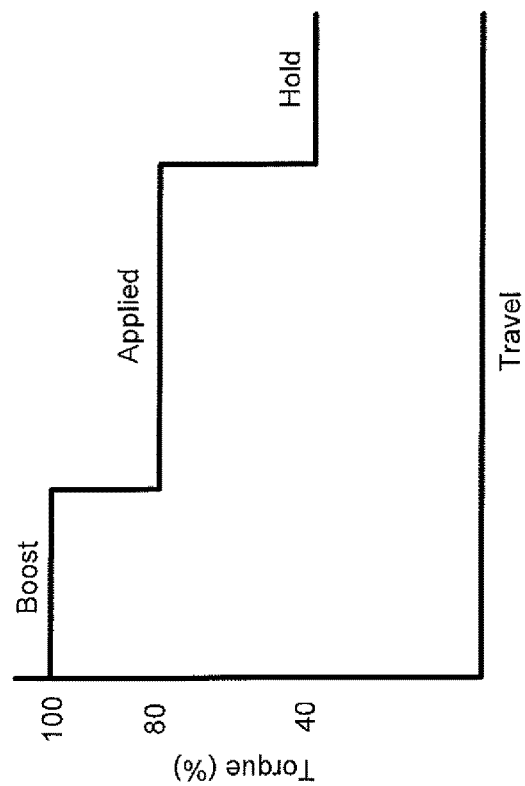
FIG. 8 is a torque plot illustrating a hold mode in accordance with the present disclosure.

Referring now also to FIG. 8, a torque plot illustrating a hold mode is shown. The hold module 24 of FIG. 1 may reduce current to a motor 39 to prevent the temperature of the motor 39 from exceeding the predetermined internal temperature. The hold module 24 may reduce the current to the motor 39 from an applied force current during an applied torque mode to a hold current during a hold mode. The hold current may provide the output torque needed to maintain a grip on an object without dropping the object. The current required to hold position of the leadscrew 50 is less than the amount of current to move the fingers 38 to a closed or gripping position. Thus, to minimize temperature of the motor 39 and to conserve energy, current to the motor 39 may be reduced after an object is gripped while maintaining an adequate gripping force on the object.

The torque plot of FIG. 8 illustrates the boost mode, the applied torque mode and the hold mode. The boost mode may be used as described above to move the fingers 38 and/or other components of the gripper off of a hard stop. After a predetermined period and/or after the fingers 38 have moved a predetermined distance, the applied torque mode may then be used to move the fingers 38 to a gripping position and grip the object. The force signal FORCE from the hold device control module 12 may indicate the force, output torque and/or amount of current used during the applied torque mode.

The hold module 24, upon detecting a stall condition, may then reduce the current to the electric motor 15 to provide a hold output torque and thus a hold force on the object. The hold current, hold output torque and/or hold force may be predetermined and stored values stored in the memory 29. The hold module 24 may reduce the current to the electric motor 15 by adjusting the force signal FORCE and/or by generating a second force signal to be used during the hold mode. The force, output torque, and/or current used during the hold mode may be predetermined and independent of the force, output torque, and/or current used during the applied torque mode. The stall condition may be detected as described above.

The current commanded by the hold module 24 may be predetermined and set to ensure that a minimum force is maintained on the object to prevent dropping of the object during the hold mode. The motor current is adjusted to and during the hold mode to maintain the motor 39 at the gripping position. The current level during the hold mode may be, for example, half the current level during the applied torque mode, while positions of the finger 38 and/or the leadscrew 50 and grip force are maintained. Although the current level to the electric motor 15 is reduced, the grip force during the hold mode may be equal to the grip force during the applied torque mode.

Figure 9:
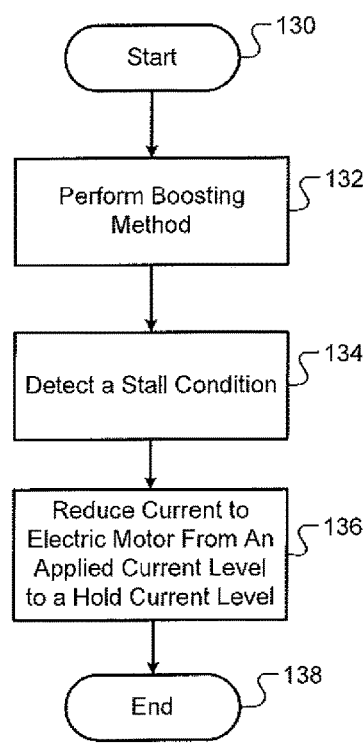
FIG. 9 illustrates a gripping method in accordance with the present disclosure.

In FIG. 9, a gripping method is shown. Although the following tasks are primarily described with respect to the implementations of FIGS. 1-2 and 8, the tasks may be easily modified to apply to other implementations of the present disclosure. The tasks may be iteratively performed. The method may begin at 130.

At 132, the boosting method is performed to move gripping elements from a hard stop and to grip and hold an object. A boost current level may be used to move the gripping elements from the hard stop. An applied current level may be used to move the gripping elements to a gripping position. The boost current level may correspond to, for example, a 100% torque level of the electric motor 15. The applied current level may correspond to, for example, an 80% current level torque level of the electric motor 15.

At 134, the stall detection module 26 detects a stall condition, as described herein.

At 136, the hold module 24 or the force control module 28 reduces current from the applied current level to a hold current level to provide a hold force. The hold current level may correspond to, for example, a 40% torque level of the electric motor 15. The hold force is greater than a minimum force to hold the object. The method may end at 138.

As an alternative, the above tasks may be modified to adjust pressures of a regulator instead of adjusting current of an electric motor when a pneumatically controlled holding or (gripper) system is used to provide the boost, applied, and hold force levels.

Force Adjustment

Pneumatic based gripper systems use a pressure regulator to reduce output force of a gripper. The pressure regulator regulates pressure within the gripper to prevent damage to gripper components. Instead of using a pressure regulator, the motor control module 14 and/or the force control module 28 provides the force signal FORCE to the motor 39 to control force applied on an object via a force adjustment routine.

The motor 39 may have an analog input that receives the force signal FORCE. The force signal FORCE may be a control signal, an analog voltage signal and/or an analog current signal that swings between, for example 0 and a predetermined voltage and/or current level. Example swing voltage ranges are 0-5 volts (V) and 0-10V. Example current swing ranges are 0-20 milli-amperes (mA) and 4-20 mA. The actual voltage and/or current supplied to the electric motor 15 may be different than a voltage and/or current level of the force signal FORCE. The force signal FORCE may be at a minimum voltage and/or current level when a current and/or voltage level supplied to the electric motor 15 is at a maximum voltage and/or current level. The force signal FORCE may be at a maximum voltage and/or current level when a current and/or voltage level supplied to the electric motor 15 is at a minimum voltage and/or current level.

Figure 10:
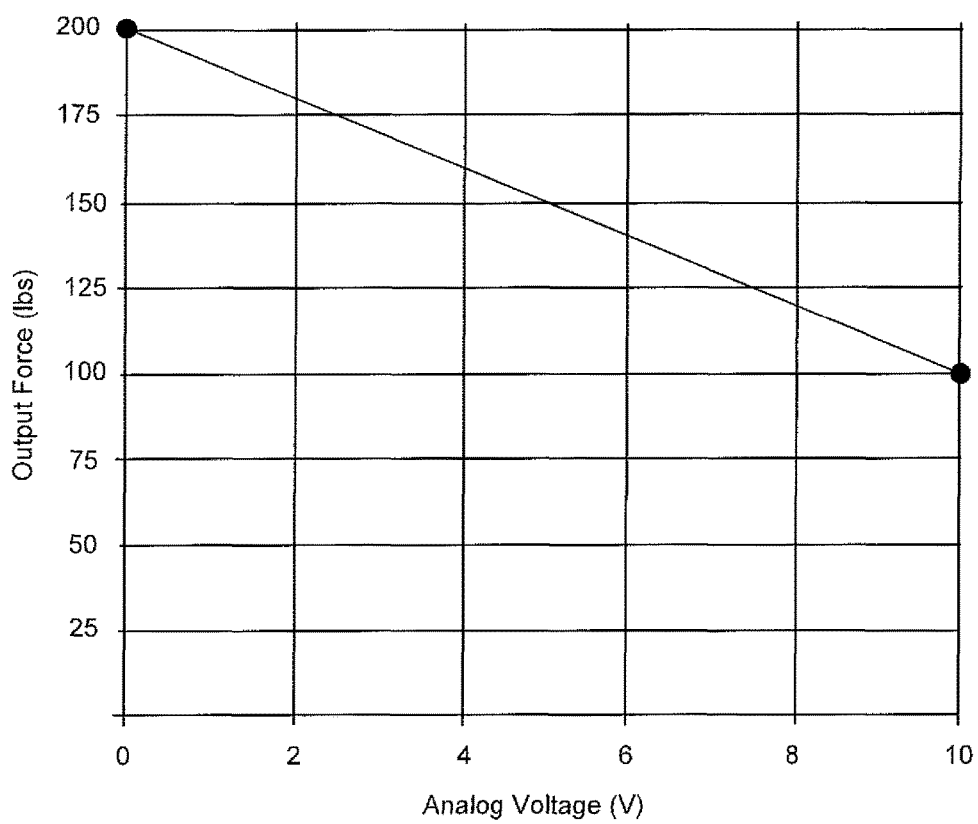
FIG. 10 is a force versus voltage graph of a transfer function in accordance with the present disclosure.

Referring now also to FIG. 10, an example force versus voltage graph of a transfer function is shown. The motor 39 may provide a maximum output force (e.g., 200 lbs) when the voltage of the force signal FORCE is 0 and a minimum output force (e.g., 100 lbs) when the voltage of the force signal FORCE is at a maximum (e.g., 10V). In the example shown, the minimum force is 50% of the maximum force. As the force signal FORCE is increased from 0V to 10V output force of the motor 39 may linearly decrease from the maximum force to the minimum force. The above-provided maximum and minimum values are provided as an example and may vary based on the mechanical and software implementation, the gripper application of use, the gripper motor, and/or the voltage and/or current settings in the holding device control module 12 and/or motor control module 14.

The output force associated with the voltage range and/or current range of the force signal FORCE can be applied independently to both the open and close strokes of the holding device 16'. The voltage and current ranges may be predetermined during a setup procedure by first assigning a minimum torque (or force) value MIN and a maximum torque (or force) value MAX. The minimum and maximum torque values MIN, MAX may be stored in the memory 29 of the motor control module 14. The motor control module 14 may then use a linear equation to interpolate and/or determine torque values between the minimum and maximum torque values MIN, MAX based on the voltage and/or current swing ranges. The voltage and/or current swing ranges may be determined when setting up the holding system 10 and/or the holding device 16' and/or may be determined in real-time during use of the holding device 16'. The voltage and/or current swing ranges may be determined at any point in a cycle of a gripping procedure.

In operation, the motor control module 14 may adjust the force signal FORCE based on the torque values set and determined during the setup procedure. The maximum torque value MAX and/or values within a predetermined range of the maximum torque value MAX may be used during a boost mode. The torque values between the minimum and maximum toque values MIN, MAX may be used during the applied torque mode. The minimum torque value MIN may be used during the hold mode. The holding device control module 12 and/or the motor control module 14 control the grip force by adjusting the force signal FORCE. As an alternative, the grip force may be controlled via an external potentiometer, which may be provided as part of a user interface of the holding device control module 12.

By using sensor(s) (e.g., encoder) internal to the motor 39 and by providing feedback from those sensors to the motor control module 14, the above-described implementations provide flexible gripper system(s). The gripper system(s) may be adjusted via the motor control module 14 to accommodate different applications and objects without changing gripper motors, cables, sensors, etc. The motor control module 14 may be programmed and reprogrammed based on the application of use. Voltage, current and/or output torque settings may be adjusted via a user interface of the motor control module 14 to accommodate different sized objects and application forces.

Figure 11:
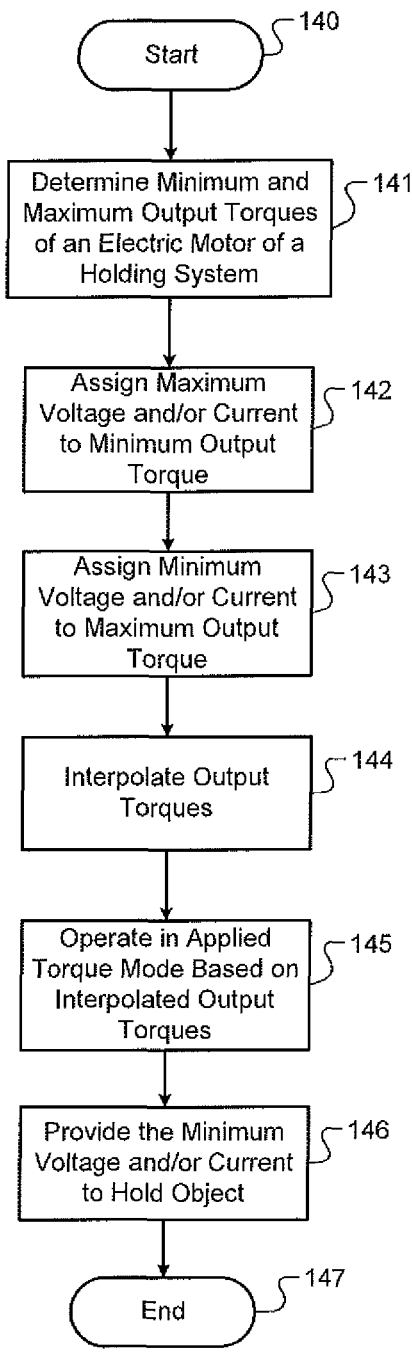
FIG. 11 illustrates a torque method in accordance with the present disclosure.

In FIG. 11, a torque method is shown. Although the following tasks are primarily described with respect to the implementations of FIGS. 1-2 and 10, the tasks may be easily modified to apply to other implementations of the present disclosure. The tasks may be iteratively performed. The method may begin at 140.

At 141, holding device control module 12, the force control module 28 or other control module determines a minimum output torque and a maximum output torque of the electric motor 15 is determined. These torque values may be stored in the memory 29.

At 142, the holding device control module 12, the force control module 28 or other control module assigns a maximum voltage and/or current to the minimum output torque for the force signal FORCE. At 143, the holding device control module 12, the force control module 28 or other control module assigns a minimum voltage and/or current to the maximum output torque for the force signal FORCE.

At 144, the motor control module 14 interpolates output torques between the minimum output torque and the maximum output torque based on the minimum voltage and/or current and the maximum voltage and/or current.

At 145, the force control module 28 operates the holding device 16 in the applied torque mode based on the interpolated output torques. The holding device 16 may be operated to perform a hold stroke to grip an object or a release stroke to release the object when in the applied torque mode.

At 145, the hold module 24 may operate the holding device 16 to hold the object by providing the minimum voltage and/or current in the force signal FORCE during the hold mode. The minimum voltage and/or current may be provided when the holding device 16 is in a stall condition. At 146, the force control module may operate the holding device 16 to release the object by providing a voltage and/or current (release voltage and/or release current) in the force signal FORCE that is greater than the minimum voltage and/or current. The release voltage and/or current may be as high as the maximum voltage and/or current. The method may end at 147.

Cable Assembly

Referring now also to FIGS. 12A-12C, perspective views and pin outs of the cable assembly 20 is shown. The cable assembly 20 includes the second connector 19 that is connected to the holding device control module 12 via the flex cable 17. The cable assembly 20 also includes the third connector 32 and the fourth connector 33. The third and fourth connectors 32, 33 may connect directly or indirectly to the motor 39. The third and fourth connectors 32, 33 are connected to the second connector 19 via a cable 149. The cable 149 includes the wires 30, 31. The cable assembly 20 allows power and signals provided to and received from the motor control module 14 to be provided via a single cable (i.e. the flex cable 17) this minimizes the interface between the holding device control module 12 and the motor control module 14.

Although various pin assignments may be used, an example pin assignment is shown. Each of the connectors 19, 32, 33 may include any number of connector pins and have any number of associated wires or signal lines, which are included in the cable 149. The number of pins in the second connector 19 may be equal to a sum of the number of pins in the third and fourth connectors 32, 33. The number of pins in the third and/or fourth connectors 32, 33 may be less than or equal to the number of pins in corresponding connectors on the motor 39. Output pin assignments can be adjusted in memory of the motor 39 and/or the holding device control module 12. An example pin out of each of the connectors 19, 32, 33 is shown.

The second connector 19 may include a POWER, GROUND, OPEN, CLOSE, OPEN SENSE, CLOSE SENSE, ANALOG FORCE and I/O POWER pins. The POWER and GROUND pins are connected to respective voltage and ground references. The signals on the OPEN, CLOSE, OPEN SENSE, and CLOSE SENSE pins may be discrete I/O signals. The OPEN and CLOSE pins receive open and close command signals to command the motor 39 to transition between OPEN and CLOSE states (i.e. actuate the holding device 16'). Use of separate OPEN and CLOSE pins and corresponding signals separating these signals and allow for a "do-nothing" state where neither signal is applied. The OPEN and CLOSE pins may be referred to as HOLD and RELEASE pins.

The OPEN SENSE and CLOSE SENSE pins are used to feedback OPEN SENSE and CLOSE SENSE signals from the motor to the holding device control module 12. The OPEN SENSE and CLOSE SENSE signals indicate when the holding device 16' has reached a hard stop while in an open or closed state. The ANALOG FORCE pin receives the force signal FORCE and is used to command an output torque of the motor 39. This pinout may be used, for example, in direct current (DC) applications.

The I/O POWER pin may be used to supply power to the motor control module 14 and/or logic devices (e.g., PNP transistors) within the motor 39. The motor 39 may receive two power supply voltages; one for providing power to the electric motor 15 and the other to provide power to the motor control module 14 and/or logic devices. This allows the electric motor 15 to be operated at a higher voltage than the motor control module 14 and/or logic devices. The increased voltage supplied to the electric motor 15 allows the electric motor 15 to be operated at increased output speeds and/or provide increased output torque levels. As an example, the POWER pin maybe provided with 48V and the I/O POWER pin may be provided with 24V. Although the third connector 32 is shown as including the ANALOG FORCE pin, the third connector may alternatively include the POWER pin.

In an alternative implementation, the I/O POWER pin is not included and the electric motor 15 operates based on the same voltage supply as the motor control module 14 and/or logic devices. When the I/O POWER is not used, the power provided to the POWER pin may be spliced and provided to corresponding POWER and I/O POWER pins in the third and fourth connectors 32, 33. This reduces the first connector from an 8-pin connector to a 7-pin connector. As an alternative to splicing power from the second connector 19 to the third and fourth connectors 32, 33, the second connector 19 may be an 8-pin connector and the holding device control module 12 may provide the same power to both the POWER and I/O POWER pins of the second connector 19.

The cable 149 may be 'Y'-shaped. Conductors of the cable 149 may be formed of, for example, gold (Au), nickel (Ni), brass, copper (Cu), zinc (Zn) and/or other electrically conductive materials. The cable 149 may include wires as shown and may not include a ground shield and/or sheath.

The pinouts shown in FIGS. 12B-12C satisfies functionality requirements of point-to-point (or hard stop-to-hard stop) applications. Hard stop-to-hard stop applications refer to applications when a gripper is transitioned iteratively between hard stops and provides force to grab an object when at the hard stops.

The gripper implementations described above allows a gripper to transition to unknown (not predetermined or stored in memory) hard stops positions while allowing an output force to be applied at the hard stop positions. The motor control module of the gripper may be programmable to allow a manufacturer and/or a user to adjust various settings disclosed herein. The motor control module may be programmed to provide one or more of any of the above described features.

Referring now to FIGS. 13 and 14, a holding device 16" is shown. The holding device 16" is a clamp and is attached to a motor 39', which may be similar to the motor 39. The motor 39' includes a motor control module 14' that linearly actuates a leadscrew 50'. The holding device 16" includes an actuating arm 150, a link 152, a crank arm 154, and a crankshaft 156, which are in a clamp housing 157. The crankshaft 156 is connected to a clamp arm 158 (or other tooling or gripping element).

In operation, the leadscrew 50' is linearly actuated and received by the actuating arm 150. The actuating arm 150 is linearly actuated to move the link 152 and rotate the crank arm 154 on the crankshaft 156. The rotational movement of the crankshaft 156 rotates the clamp arm 158 to apply pressure on and/or hold a part 160 on a fixture 162. The clamp arm 158 may be attached to a toggle mechanism and/or links to lock to the part 160. The motor 39' and/or the holding device 16" may hold the clamp arm 158 in a locked state when electrical power is removed from the motor 39'. The clamp arm 158 is in a HOLD state when in contact with the part 160 and is in a RELEASE state when not in contact with the part 160. FIG. 13 shows the clamp arm 158 in the RELEASE state and FIG. 14 shows the clamp arm 158 in the HOLD state.

The motor control module 14' may operate the motor 39' to actuate the clamp arm 158, as described above for the operation of the motor control module 14 and the motor 39 in actuating the fingers 38 and with respect to the implementations of FIGS. 2-11. This includes detecting stall conditions, shutting off power to the motor 39', boosting output torque of the motor 39', moving the clamp arm 158 away from the hard stop, reducing power during a hold mode, adjusting force output of the motor 39', etc.

In FIGS. 15-17, torque plots (or profiles) illustrating a move mode and multiple applied modes and a gripping method are shown. The motor control module of FIG. 1 may further include a move module 200. The move module may implement a move mode, examples of which are illustrated in FIGS. 15-17.

Although the following tasks are primarily described with respect to the implementations of FIGS. 1-2 and 15-16, the tasks may be easily modified to apply to other implementations of the present disclosure. The tasks may be iteratively performed and may be implemented in a holding system, such as in a gripping system or a clamping system. The method may begin at 208.

At 210, the boosting method is performed (the boost torque mode is activated) to move gripping elements from a hard stop and to grip and hold an object. A predetermined boost current level may be used to move the gripping elements from the hard stop. The predetermined boost current level may correspond to, for example, a 100% torque level of the electric motor 15. Subsequent to task 210, the holding system is transitioned from the boost torque mode to a move torque mode.

At 212, a move torque mode is activated via, for example, the move module 200. The move module 200 sets a predetermined move current level for the electric motor 15 to minimize resulting motor heat and thus increase life of the electric motor 15. The predetermined move current level may be used for a predetermined period. The allowed torque during the move mode is at a level to cycle or move the gripping elements and/or a clamping arm reliably to a gripping position. The predetermined move current level may correspond to, for example, a 30% torque level of the electric motor 15 when gripping elements are being moved, as in FIGS. 2 and 6.

The predetermined move current level may be at, for example, a 60% torque level when moving a clamping arm, as in FIGS. 13 and 14. It is assumed for clamping applications that there is a tooling weight on an arm, which is being moved. Also, by keeping the move current level low (i.e. less than a predetermined level), an impact experienced at an end of a stroke will be minimized. Reducing this impact as well as the overall motor heat maximizes longevity of the electric motor 15.

At 214, the end-of-travel module determines whether an end of a stroke (or end-of-travel) condition has been detected. Task 216 is performed when an end of a stroke has been detected. At 216, the applied torque mode may be activated and the move torque mode may be deactivated when an end of a stroke is detected. A predetermined applied current level may be used to compress materials, components, and/or objects having physical compliance that are in a holding system, a gripper, a clamp, and/or a system and/or object being held. The compression is provided to adequately grip or hold the object. The compression may also be provided to remove, for example, gaps in the holding system, gripper, clamp, and/or system and object being held. The predetermined applied current level may correspond to, for example, a 50-100% torque level of the electric motor 15.

A predetermined length of the applied torque mode is set. As an example, in a gripper application, examples of which are provided above, the predetermined length of the applied torque mode may be set to 50 milliseconds (ms). As another example, in a clamp application, examples of which are provided above, the predetermined length of the applied torque mode may be set to 175 ms.

In FIG. 15, the applied torque mode is shown as providing a predetermined applied current level of 100%. In other implementations, the amplitude of the predetermined applied current level may be based on a force adjustment routine, as described with respect to FIG. 10. FIG. 16 shows resulting applied torque levels when using a 0-5V analog input. Subsequent to the applied torque mode, the torque (or current) control algorithm can then transition to operating in the hold torque mode.

At 216, the hold module 24 or the force control module 28 reduces current from the predetermined applied current level to a predetermined hold current level to provide a hold force. The predetermined hold current level may correspond to, for example, a 40% torque level of the electric motor 15. The hold force is greater than a minimum force to hold the object. The method may end at 220.

Although the terms first, second, third, etc. may be used herein to describe various voltages, currents, elements, modules, signals, and/or connectors, these items should not be limited by these terms. These terms may be only used to distinguish one item from another item. Terms such as "first," "second," and other numerical terms when used herein do not imply a sequence or order unless clearly indicated by the context. Thus, a first item discussed herein could be termed a second item without departing from the teachings of the example implementations.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A holding system comprising:
a holding device control module configured to (i) provide a power output and (ii) generate an open signal, a close signal, and a force signal, wherein the force signal indicates a requested output torque of an electric motor;
a motor control module configured to generate feedback signals indicating a stall condition of a holding device, wherein the feedback signals are generated by a sensor mounted within a housing of the electric motor; and
a cable assembly comprising:
a first connector configured to connect to the holding device control module via a cable, wherein the cable is connected between the holding device control module and the cable assembly,
a second connector connected to the motor control module and providing the open signal and the close signal from the holding device control module to the motor control module, wherein the second connector provides the feedback signals from the motor control module to the holding device control module,
a third connector connected to the motor control module and providing the power output or the force signal from the holding device control module to the motor control module, and
signal lines separate from the cable assembly and connected between the (i) first connector and (ii) at least one of the second connector and the third connector.

2. The holding system of claim 1, wherein the signal lines comprise:
a first set of lines connected between the first connector and the second connector; and
a second set of lines connected between the first connector and the third connector.

3. The holding system of claim 1, wherein gripping elements of the holding device are not moving when in the stall condition.

4. The holding system of claim 1, wherein a component of the holding device is against a hard stop and is not moving when in the stall condition.

5. The holding system of claim 1, wherein the second connector provides a first signal and a second signal from the motor control module to the holding device control module, wherein the first signal indicates when the holding device has reached a hard stop while in an open state, and wherein the second signal indicates when the holding device has reached a hard stop while in a closed state.

6. The holding system of claim 1, wherein:
the second connector provides a power signal from the holding device control module to the motor control module;
the power output is at a first voltage;
the power signal is at a second voltage;
the second voltage is less than the first voltage;
the second connector provides the power output to the motor control module to supply power to the electric motor; and
the second connector provides the power signal to power the motor control module.

7. The holding system of claim 1, wherein the second connector provides the power output from the holding device control module to the motor control module.

8. The holding system of claim 1, wherein:
the second connector receives a first portion of the power output from the first connector and provides the first portion of the power output from the holding device control module to the motor control module to power the electric motor; and the third connector receives a second portion of the power output from the first connector and provides the second portion of the power output from the holding device control module to the motor control module to power the motor control module.

9. The holding system of claim 1, wherein the third connector provides the force signal from the holding device control module to the motor control module.

10. The holding system of claim 1, wherein:

the first connector provides a first portion of the power output to a first pin of the second connector;

the first connector provides a second portion of the power output to a second pin of the second connector;

the second connector provides the first portion of the power output to the motor control module to power the electric motor; and the second connector provides the first portion of the power output to the motor control module to power the motor control module.

\* \* \* \* \*